METHOD AND MEANS FOR CONTROLLING A PIPING SYSTEM

Filed Dec. 5, 1960 10 Sheets-Sheet 1

INVENTOR.
ALBERT J. LOEPSINGER
BY David D. McKenney
ATTORNEY

INVENTOR.
ALBERT J. LOEPSINGER
BY
David D. McKenney
ATTORNEY

METHOD AND MEANS FOR CONTROLLING A PIPING SYSTEM

Filed Dec. 5, 1960 10 Sheets-Sheet 3

INVENTOR.
ALBERT J. LOEPSINGER
BY David D. McKenney
ATTORNEY

METHOD AND MEANS FOR CONTROLLING A PIPING SYSTEM

Filed Dec. 5, 1960 10 Sheets-Sheet 4

INVENTOR.
ALBERT J. LOEPSINGER
BY David D. McKenney
ATTORNEY

Dec. 31, 1963 A. J. LOEPSINGER 3,115,886

METHOD AND MEANS FOR CONTROLLING A PIPING SYSTEM

Filed Dec. 5, 1960 10 Sheets-Sheet 5

INVENTOR.
ALBERT J. LOEPSINGER
BY David D. McKenney
ATTORNEY

INVENTOR.
ALBERT J. LOEPSINGER
BY David D. McKenney
ATTORNEY

INVENTOR.
ALBERT J. LOEPSINGER
BY
David D. McKenney
ATTORNEY

INVENTOR.
ALBERT J. LOEPSINGER
BY David D. McKenney
ATTORNEY

INVENTOR.
ALBERT J. LOEPSINGER
BY David D. McKenney
ATTORNEY

INVENTOR.
ALBERT J. LOEPSINGER
BY David D. McKenney
ATTORNEY

United States Patent Office 3,115,886

Patented Dec. 31, 1963

3,115,886

METHOD AND MEANS FOR CONTROLLING A PIPING SYSTEM

Albert J. Loepsinger, Barrington, R.I., assignor to Grinnell Corporation, Providence, R.I., a corporation of Delaware Filed Dec. 5, 1960, Ser. No. 73,951
29 Claims. (Cl. 137—16)

This invention relates to improvements in method and means for controlling a piping system which is subject to movement caused by changes in temperature. More particularly it has to do with method and means for controlling the piping system stresses which result from such thermal movement. This control is achieved by the application of external forces at selected locations on the system and in selected directions. In addition this invention has to do with methods and means for maintaining the controlled stresses below safe values.

The methods and means of the present invention are particularly useful for controlling the piping systems found in power plants, for example, the main steam line which conducts steam from the superheater header to the turbine in such a plant.

The problem which this invention solves is that of mounting and supporting the pipe line and the items to which it is connected so that the movements caused by thermal expansion and contraction will not result in unsafe stresses anywhere in the system. These movements referred to are caused by the changes in the dimensions of the items as the temperature changes between room temperature (at which the line must be installed) and operating temperature, and if these movements are resisted stresses are developed in the material of the piping and of the associated items. It is virtually impossible to design and install a practical system in which these movements are not resisted to some extent. In order to do so it would be necessary to have perfectly free movement of each part of the system to the position it would assume as a result of the increased dimensions. This is obviously impractical, and what actually happens is that the increasing dimensions result in some distortion of the material of the piping and other items due to resistance of certain points in the system to the required movement. The reason for this is that these points are rigidly or semi-rigidly anchored to the building structure, and even where an attempt is made to provide for free movement of other parts some resistance to it is usually encountered and stresses are produced. The amount of the stress at any particular location depends upon a number of factors including the configuration and dimensions of the system and of the components therein, the number and location of the anchor points and the friction at those points which are movably secured to fixed structure.

There are some critical points in a piping system where the maximum allowable forces exerted due to thermal expansion are quite small. Usually these are at the terminal connections of the pipe line with the boiler and turbine. For example, it is customary for the turbine manufacturer to require that the force exerted on each connection of the main steam line with the turbine casing does not exceed 4000 pounds in any direction. The reason for this requirement is that larger forces might distort the turbine casing enough to allow the turbine blades to strike it. The tolerance between these blades and the casing is often as little as a few thousands of an inch.

In the past the forces imposed on the turbine casing by the main steam line connections have been kept below the manufacturer's specified limits by making the pipe line so long and of such a configuration that great flexibility of the line resulted and thus flexibility prevented the thermal movement from producing substantial forces at the critical points. However, it is not uncommon for the main steam line in a power plant to be made of carbon molybdenum steel pipe having a 36 inch outside diameter and a 4 inch pipe wall. A short length of such pipe constitutes a non-flexible structure, and in order to provide a line of such pipe which is so flexible that its thermal expansion does not result in the exertion of substantial force on the relatively immovable equipment to which it is connected, it has been customary to make such a line very long and to form it in such a way that it acts as a large expansion bend.

The difficulty with this solution of the problem is that it usually involves the use of much more pipe than is actually necessary to conduct the steam by the shortest distance from the superheater header to the turbine. The amount of piping in excess of that required for this minimum distance is therefore provided solely to achieve the flexibility above described. Such flexibility is obtained at a substantial price because the main steam line may cost as much as $1,000 per foot.

One of the results of having such a long pipe line system is that in providing enough flexibility to keep the stresses at the terminal points low the stresses developed at other points along the line are completely safe. The primary reason for this is that higher stresses can be tolerated at these other points than at the critical terminal points. Similarly it has been found that even if the main steam line is made just long enough to conduct the steam from the superheater to the turbine by the shortest possible path (an arrangement which normally results in excessive forces at the critical terminal points) the stresses at the other points along the line would still be well below the allowable values.

In one of its embodiments the present invention makes possible the use of generally shorter pipe lines than have been possible heretofore because it applies external force to the pipe line to reduce the stresses at predetermined critical points. As a matter of fact these stresses may be reduced to substantially zero if so desired. This force is applied automatically in response to the stresses at these or other points reaching predetermined values. Any resulting increase in the stress at other locations along the pipe line is permissible because the allowable stresses at these other locations are still not exceeded.

With any pipe line, it is found that because of failure of the pipe and other apparatus to be exactly as specified by the designing engineers and because of friction in those parts of the apparatus which are required to move, the pipe line at elevated temperaures does no assume the position which the designing engineers calculate that it will assume. In the case of a conventionally long pipe line the stresses in the calculated position are acceptable, the pipe line being deliberately designed to make them so, and accordingly, another embodiment of the invention envisages applying external force to force the pipe line to approximate the calculated location thereof at the elevated temperatures or to at least force it to approach calculated position.

In general the invention contemplates controlling the movement of the pipe at elevated temperatures due to expansion and contraction effects by applying external force to the piping system to force it to move to a predetermined position at the elevated temperature different than the position it would otherwise occupy. Such predetermined position may be calculated position, in which acceptable stresses are applied to the end connections, or a position in which the connections are rendered substantially stress-free or any other desired position, usually selected to maintain safe stresses on the end connections.

The present invention in one of its aspects differs from the device described in U.S. Patent No. 2,248,730 to provide constant support for the piping because in the latter case the movement of the point of attachment of the device to the pipe due to a temperature change controls the device to accommodate such movement of the pipe while maintaining the support of the portion to which it is attached constant whereas in accordance with the present invention the force applying mechanism is responsive to such temperature change to control the movement of the pipe to force it to move to a predetermined position. This predetermined position is different than the position to which the portion would move due to such temperature change when supported by a substantially constant force substantially equal to the weight of such portion. The force applying mechanism of the present invention may be actuated by movement of another portion of the pipe due to temperature change thereof.

In a preferred embodiment of the present invention the force applying mechanism is controlled by means having a reference with respect to which change in a pipe condition, such as changes in temperature, are measured, these measured changes being employed to actuate the force applying mechanism and the reference being substantially unaffected by movement of the pipe by the force applying means. In this respect it also differs from the constant support device described in U.S. Patent No. 2,248,730.

In another aspect the invention in a preferred embodiment is novel in that the force is applied at least in response to temperature indicia other than movement of the point on the pipe to which the force is applied.

Furthermore, the control mechanism for controlling the force exerting unit is not responsive to changes in any weight supporting force provided by such force exerting unit due to a temperature change.

The external force is applied automatically in response to the temperature.

Accordingly, it is one object of the present invention to provide an improved method of controlling the stresses in a system of piping and associated equipment.

Another object is to provide a method of controlling the stresses in a piping system by applying external forces to one or more predetermined points in the system.

Another object is to provide a method of controlling stresses in a piping system by applying to predetermined points in the system forces which are not merely weight supporting forces.

Another object is to provide a method of controlling the stresses in a piping system by applying variable external forces to predetermined points in the system.

Another object is to provide a method of controlling the stresses in a piping system by exerting at selected points thereon and in selected directions forces which counteract the forces developed at such points by resistance to thermal expansion and contraction.

Another object is to provide a method of controlling the stresses in a piping system by applying force exerting devices at predetermined points to keep the stresses at the same or other points below predetermined values.

Another object is to provide a method of controlling the stresses in a piping system by automatically exerting at a point on the system, and in response to a change in a condition of the system a force which produces predetermined movement of a point on the system.

Another object is to provide a method of controlling the stresses in a piping system by automatically exerting at a point on the system, and in response to change in the temperature of the system, a force which counteracts the stress created at a point in the system by resistance to thermal movement.

Another object is to provide improved means for practicing the methods described.

Another object is to provide means for applying an external force to a piping system to force at least a portion of said system to move to a position which approximates its calculated position.

Another object is to provide means for applying a force to a piping system at an elevated temperature to move at least a segment thereof to a position which differs from the position it would otherwise assume at said temperature without the force. The position which the segment is forced to assume may be one which approaches the calculated position for said segment or one in which the end connections are rendered substantially stress-free or any other desired position.

Another object is to provide a force applying means as set forth above which is coupled with a source of energy and which is controlled by controlling the coupling in response to temperature change.

In one arrangement for utilizing the present invention these objects are attained by connecting between fixed structure and a point on the piping system a motor-driven force-exerting device which is responsive to the operation of a switching device. This switching device indicates when the stress at one location in the system exceeds a predetermined limit by the closing of a pair of contacts. These contacts are in a circuit which when completed energizes the motor of the force-exerting device and causes it to apply a force on the pipe of such an amount and in such a direction that the piping is moved in a direction tending to relieve the stresses caused at the location by the resistance to expansion or contraction. Accordingly, the stress is decreased at the particular location.

In the drawings:

FIG. 1 is a perspective and somewhat diagrammatic view of a pipe line on which the method and means of the present invention are being applied;

FIG. 1*a* is a fully diagrammatic side elevation view of the pipe line of FIG. 1 with dotted lines showing in exaggerated form the position of the pipe line at operating temperature;

Figures 1, 1A:
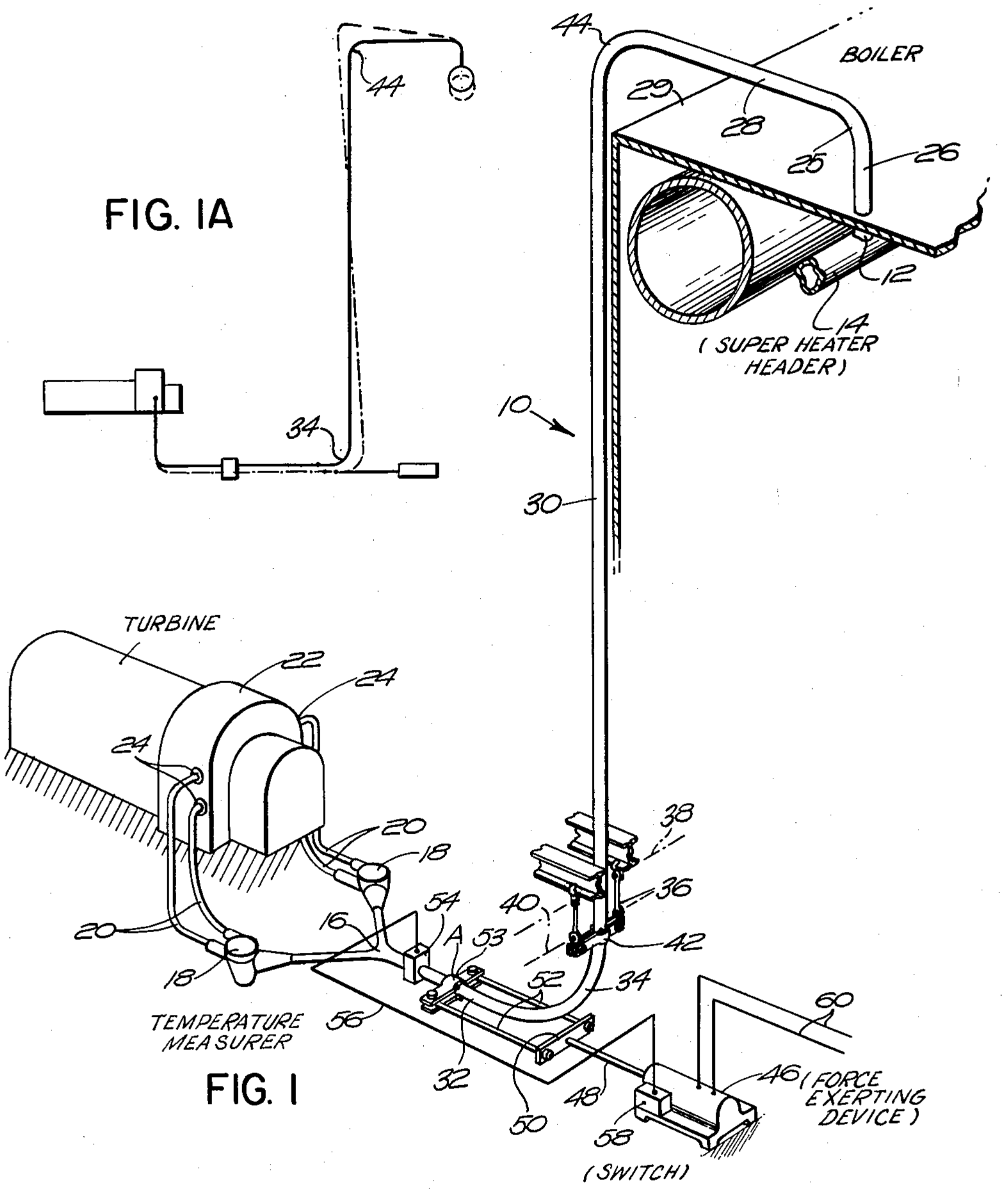
Figure 2:
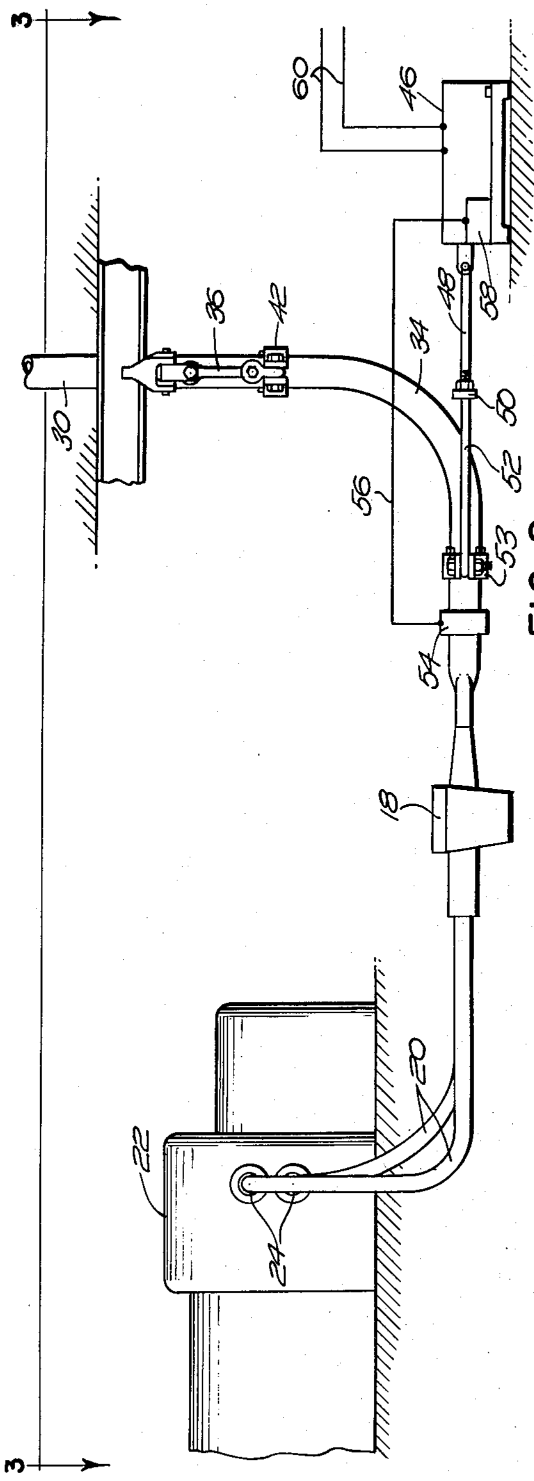
FIG. 2 is an enlarged diagrammatic side elevation view of the lower portion of the pipe line of FIG. 1 and illustrates in more detail the arrangement of the force-exerting and switching devices.
Figure 3:
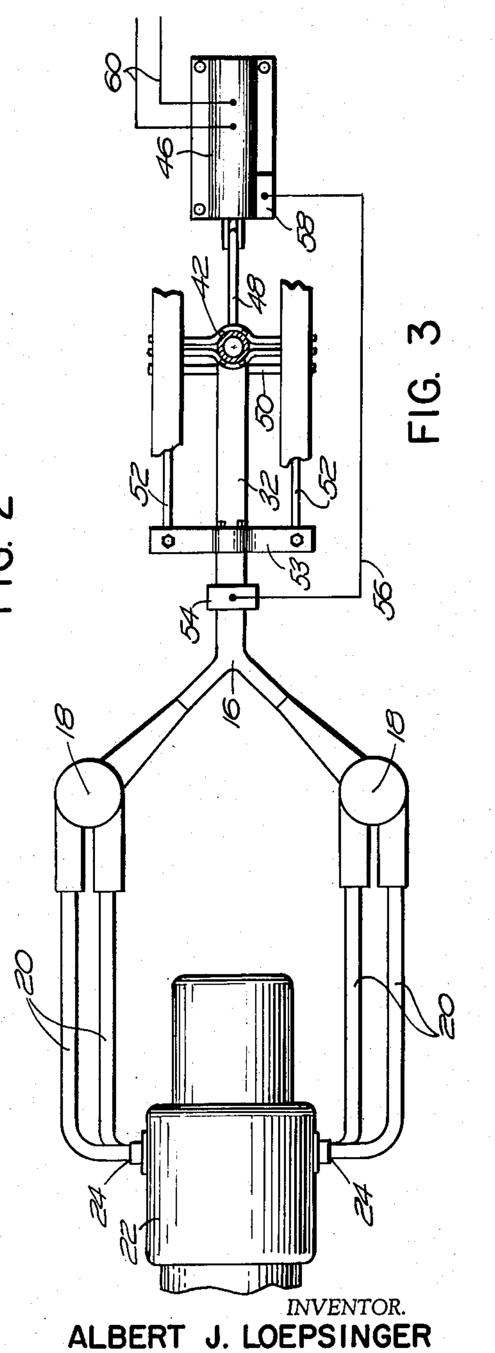
FIG. 3 is a plan view taken on line 3—3 of FIG. 2.

Referring now more particularly to the drawings, FIG. 1 is a perspective view of the main steam line 10 in a power plant. The upper end 12 of this line is shown connected to a superheater header 14 and the lower end divides at 16 into two branches each connected to a stop valve 18 from which two smaller lines 20 lead to the casing of a steam turbine 22 to which they are connected at points 24. Because of the design of modern boilers and the required location of steam turbine and generators in a power plant, the main steam line shown in this FIG. 1 is about as short as it can be. Except for the smaller lines 20 and the branch at 16 it all lies in one plane and comprises a short vertical portion 26 leading upwards from the header 14, a horizontal portion 28 long enough to extend to the front of the boiler 29, a long vertical section 30 extending down along the front of the boiler to a point below the level of the turbine and short horizontal portion 32 long enough to accommodate the branch at 16, the stop valves 18 and smaller lines 20.

Although this line has a minimum length it is long enough so that the change in this length due to the change in temperature from room temperature to operating temperature results in substantial forces exerted on the connection points at 12 and 24 if these points do not move correspondingly. The fact is that these points 12 and 24 do themselves undergo some movement of their own due to thermal expansion, but it is not precisely that movement which perfectly accommodates the growth of the pipe line, and the result is distortion of the configuration of the pipe line producing substantial forces at the connecting points.

Since the pipe line shown in FIG. 1 is substantially all in one plane this distortion would most likely take the form of decreasing the angle of each of the bends 34 and 44 and increasing the angle of the bend 25, as indicated in exaggerated form by the dotted lines in FIG. 1*a*.

The turbine manufacturer customarily requires that the forces exerted on the turbine connections 24 do not exceed a certain number of pounds in any direction, for example, 4000 pounds. Similarly the boiler manufacturer customarily requires that the forces exerted on the superheater header by connection thereto of the pipe line end 12 do not exceed a certain number of pounds in any direction, although this limitation is usually considerably more liberal than that imposed by the turbine manufacturer. These requirements are very difficult to meet because of the great weight and relative rigidity of the main steam line. As previously mentioned these requirements were met in the past merely by making the line long enough so that the resulting flexibility would keep the terminal forces below the set limits.

In addition to merely making the line long and flexible it has also been customary in the past to employ anchor devices which isolate from the critical end connections certain parts of the temperature and pressure growth. Such anchor devices can also be used to advantage in the present invention and are illustrated in the drawings. For example, the rigid hangers 36 provided on the pipe line of FIG. 1 at the lower end of the vertical portion constitute such devices. These hangers isolate from the turbine connections 34 the larger part of the force resulting from growth of the vertical portions 30 and 26 and vertical movement of header 14, as will be hereinafter explained. The upper ends of these hangers are pivoted to the fixed building structure about a horizontal axis 38 at right angles to the plane of the pipe line and the lower ends are similarly pivoted to a clamp 42 on the pipe line about an axis 40 which is parallel to the axis 38. Because these hangers are rigid and prevent any substantial vertical movement of the clamp 42 and because this clamp is located at substantially the level of the turbine axis, the growth of the vertical sections between this clamp and the turbine cancel each other and have no substantial effect on the thermal expansion forces exerted at the turbine connections. In other words this clamp isolates from the turbine connections any possible effect of the vertical growth of the portion of the pipe between the clamp 42 and the superheater header.

Unlike the growths of the vertical sections the effect of the growths of the horizontal sections on the turbine connections 24 cannot be reduced or eliminated by properly locating horizontal restraint similar to rigid hangers 36. The reason for this is that turbine connection 24 normally has a great horizontal movement toward boiler and because the pipe layout makes it impractical to locate a zero horizontal movement point.

Referring to the portion of the line between the clamp 42 and the turbine, the thermal growth of the horizontal portion of this section results in a substantial change in the length of this section. The hangers 36 are pivoted so that the clamp 42 may swing with such movement. This swing is to the right in FIG. 1 because the turbine connections 24 also move to the right from thermal expansion of the turbine casing. However, the header 14 does not move to the right a distance which corresponds to this movement and the result is to distort the line, for example, by decreasing the angles of the bends 34 and 44, by increasing the angle of the bend 25 and by bending the straight sections. Such distortion results in substantial horizontal forces being exerted at the turbine connections 24. However, in accordance with the present invention the force exerting device 46 exerts on the pipe line at a point A a force of such magnitude and in such a direction that while the line is heating up to operating temperature the forces exerted on the turbine connections 24 by this distortion are greatly reduced. Thus this device pulls the point A (see FIG. 6) on the pipe to the location A″ to which this point would move if the turbine connections 24 and the portion of the line between these connections and point A were free to move with thermal expansion.

More particularly the force exerting unit 46 has a rod 48 with its outer end connected to the center of a cross bar 50 the ends of which have connected to them the ends of a pair of rods 52 which in turn have their other ends connected to a pipe clamp 53 engaging the pipe at the point A. Adjacent this point A is a pipe temperature measuring unit 54 from which a conduit 56 extends to a switching device 58 associated with the force exerting unit 46. As shown this unit 46 is electrically operated and receives its power through electrical leads 60 from a source not shown.

Figures 4, 5:
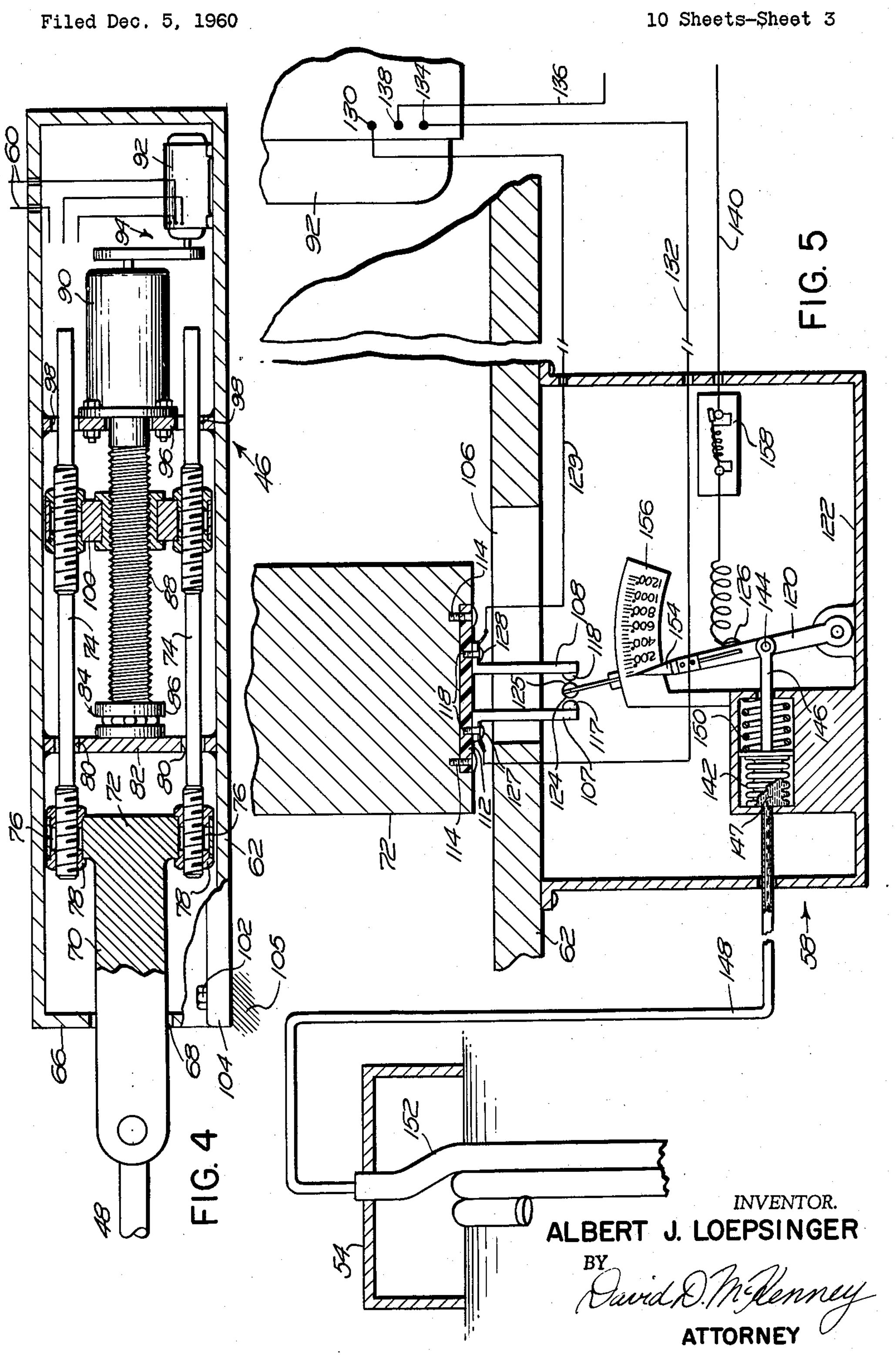
FIG. 4 is a diagrammatic view of a force-exerting device which may be used in the practice of the method of the present invention.
FIG. 5 is a diagrammatic view of a switching device which may be used in the practice of the method of the present invention together with an accompanying electrical circuit.

Referring now more particularly to FIG. 4, this shows somewhat diagrammatically a cross-section side elevation view of the force exerting unit 46. The unit has a casing 62 which is substantially a closed cylinder provided at one end 66 with central guiding aperture 68 which accommodates a reciprocating rod 70. One end of the rod 48 previously described is pivoted to the end of this rod 70 which projects from the casing. The other end of this rod 70 which is within the casing has formed integrally thereon a cross head 72 the ends of which carry a pair of force transmitting rods 74 which extend longitudinally of the cylindrical casing 62. These rods 74 pass through openings 76 in the cross head 72 and are secured thereto by nuts 78 threaded on the rods 74 and clamping opposite sides of the cross head. The rods 74 then extend through guiding openings 80 in a wall 82 which provides the mounting for a centrally located thrust bearing 84. The rotatable part 86 of this bearing carries one end of a threaded screw member 88 which is positioned substantially axially within the casing 62 and is driven at its other end by a centrally located speed reducing unit 90. This unit is in turn driven by an electric motor 92 through the belt and pulley system 94. A second wall 96 provides the mounting for the unit 90 and is provided with guiding openings 98 receiving the rods 74. Threadedly engaged on the screw member 88 and secured to the two rods 74 between the walls 82 and 96 is a nut member 100 which is driven along the screw member 88 by rotation thereof to thereby reciprocate the rods 74, cross head 72, rod 70 and rod 48.

The electric motor 92 is reversible so that the nut member 100 may be moved in either direction, and the gear ratio provided by the speed reducing unit 90 and the belt and pulley system 94 is such that very small motor 92 is capable of exerting very large forces through the rod 48, although the rate of movement of this rod is, of course, correspondingly small. Bolts 102 passing through flanges 104 on the casing 62 serve to mount the unit on some fixed structure 105 in the power plant.

Referring now to FIG. 5 of the drawings, this shows somewhat diagrammatically the switching device 58 and temperature measuring unit 54 of FIG. 1. The switching device is preferably located on the outside of the casing 62 adjacent the cross head 72 and is actuated through a slot 106 in this casing by switch arms 107 and 108 mounted on the side of the cross head. More particularly, the cross head is provided opposite the slot 106 with an insulating block 112 embedded in the cross head and secured thereto by screws 114. The switch arms 107 and 108 are mounted on this block in insulated relationship with respect to each other and the cross head by screws 118. The contact surfaces 117 and 118 of the switch arms are faced toward each other. A switch lever 120 is pivotally mounted on the casing 122 of the switching device so as to swing in the plane of the two switch arms 107 and 108. The end of the lever extends between these arms and carries on its opposite sides a pair of spring contacts 124 and 125 which are electrically connected to a terminal 126 mounted on the lever. The arms 107 and 108 are similarly provided with terminal connections 127 and 128, respectively. An electrical conductor 129 leads from one terminal 130 of the electric motor 92 to the terminal 128 and another conductor 132 leads from another terminal 134 on the motor to terminal 127. A third conductor 136 leads from the source of power not shown to another motor terminal 138, and a fourth conductor 140 also leads from this source of power to the terminal 126 on the lever 120. This lever is rotated about its pivotal mounting by a bellows 142 mounted on the switching device casing 122 and carrying a piston rod 146 pivotally connected to the lever at 144. An increase in the pressure of a fluid 147 which is conducted under pressure to the bellows by a conduit 148 tends to move the piston rod 146 to the right to swing the lever 120 in a clockwise direction against the action of a spring 150 which tends to swing the lever back in a counter-clockwise direction when the fluid pressure is diminished.

The conduit 148 leads to the bellows from a reservoir 152 located adjacent the pipe so that changes in the temperature thereof quickly produce corresponding changes in the temperature of the fluid 147. More particularly, this reservoir is located in the switching device housing 54 shown in FIG. 1 and comprises a tubing of considerably greater inside diameter than the conduit 148 so that even with a relatively short length of this tubing its volume is very much greater than the volume of the conduit 148 and bellows 142. The fluid used is one which expands sufficiently with the increases in temperature of the pipe to produce appreciable movement of the bellows 142.

The lever 120 is provided with a pointer 154 which cooperates with a fixed dial 156 to indicate what the position of the point A should be for the various temperatures to keep the forces on the turbine connections 24 below the specified number of pounds. Thus, for example, this dial is graduated in degrees and the movement of the cross head 72 which results from a given movement of the lever (in a manner which will presently be explained) is that which the point A would make if the pipe were perfectly free to move between the connection points 24 and the point A.

The operation of the switching unit of FIG. 5 is as follows: Starting with the pipe line at room temperature the pointer 154 is opposite the zero mark on the dial 156. As the pipe is heated up by the steam conducted to the turbine the fluid 147 expands and moves the bellows 142 to the right to move the lever 120 in a clockwise direction. The switch arm contact 118 and the lever spring contact 125 are arranged so that after the pipe has heated up enough to move the pointer 154 clockwise a predetermined amount on the dial, for example, to the 50° mark, the contact 125 engages the contact surface 118 and completes a circuit which, after a short delay, turns on the motor to drive the cross head 72 to the right in FIG. 5. The delay is introduced by a time-delay switch 158 located in the circuit in conductor 140. Movement of the cross head to the right in FIG. 5 pulls the pipe until point A is at the position which it would naturally assume at this temperature of 50° if the portion of the pipe line between turbine connections 24 and point A was completely unrestrained, this position having been determined in advance and the switches arranged accordingly. The time-delay is employed so that the circuit established by the closing of contacts 125 and 118 will not be immediately interrupted again by the first small movement of the cross head 72. The contact 125 is a light spring contact so that during the delay some additional clockwise movement of the lever 120 is permitted after the initial engagement of contacts 125 and 118. The motor therefore continues to operate a significant time after it starts to move the cross head 72 to the right before the contact surface 118 is again separated from contact 125. The speed of movement of the cross head 72 is arranged to be always considerably faster than the most rapid movement of the end of the lever 120.

The force exerting device holds the point A on the pipe line at its 50° location until a further increase in temperature again moves the lever 120 to once more complete the circuit previously described and turn on the motor, and this intermittent operation continues until the pipe line has reached operating temperature.

In the above-described method according to the present invention it is assumed that the pipe line is fabricated so that when installed at room temperature there are no appreciable forces exerted at the terminal points 12 and 24. In other words the portions of the pipe line are made of such length and configuration that ti is not necessary to distort the line in order to complete the assembly.

There is, however, another well-known technique employed in the installation of such pipe lines. It is sometimes described as "cold pulling." In brief, this technique involves the fabrication of the pipe line in such a way that to achieve the final assembly at room temperature it is necessary to distort the line. With full cold pulling the lengths of the portions of such a line are chosen so that when the line is at operating temperature the thermal expansion has resulted in the removal of substantially all distortion. The justification for cold pulling is that it may be better to have the maximum stresses and the maximum forces exerted at the critical terminal points when the line is cold rather than when it is hot.

A modification of the cold pulling technique involves applying, during assembly, only a part of the distortion which would be required to make the critical terminal points stress-free at operating temperature. In such a case the forces at these terminal points would be minimum when the line is at a temperature somewhere between room temperature and operating temperature, and forces would reappear at the terminal points at operating temperature. Thus, with this modified cold pulling technique there are some forces exerted at the terminal points both when the line is at room temperature and when it is at operating temperature but usually these forces are less in both extremes of temperature than they would be in the hot position when there is no cold pulling or in the cold position when there is a full cold pulling.

Figure 6:
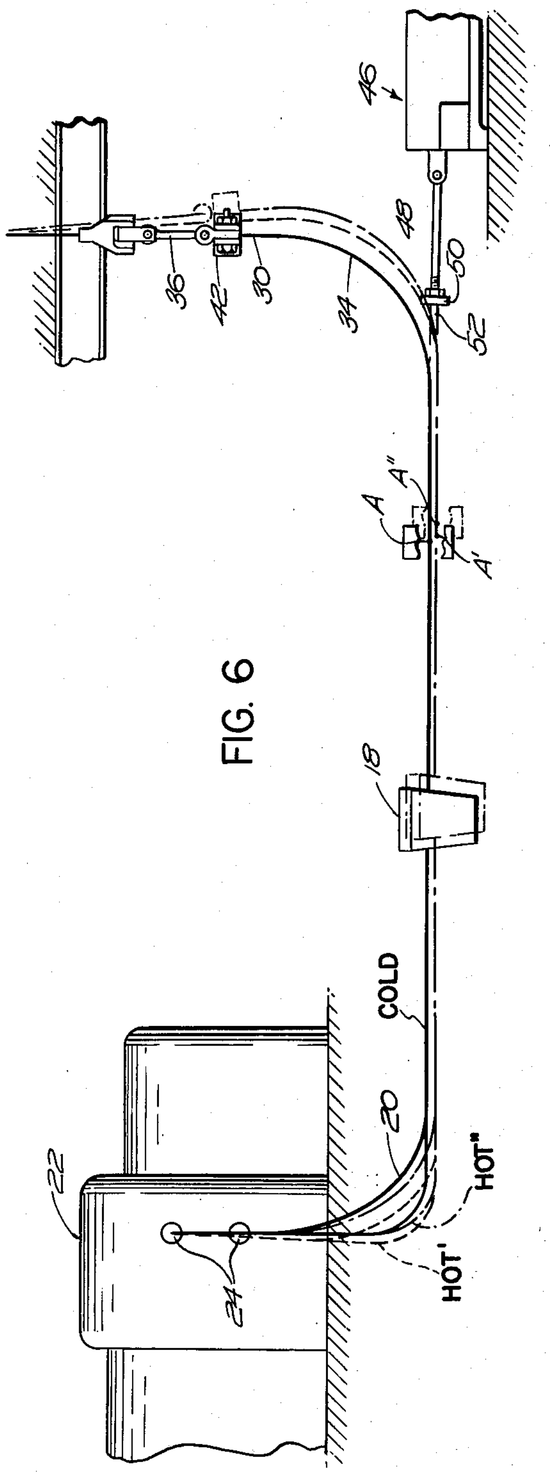
FIG. 6 is a diagrammatic view like FIG. 2 with the pipe shown in both hot and cold positions and illustrating the path of movement of the point on which the exterior force is applied.

The method of the present invention may be employed when cold pulling is used as well as when it is not. The difference between the application of the present invention with and without cold pulling is illustrated in a comparison of FIGS. 6 and 8. FIG. 6 is an enlarged diagrammatic side elevation view of the lower portion of the pipe line of FIG. 1 with the configuration of the pipe in cold position (at room temperature) shown as a solid line. Two hot positions (operating temperature) are also shown. One of these (HOT′) is a dotted line and represents the position of the pipe when the method and means of the present invention are not being employed. Thus without the present invention and without cold pulling the point A would move to A′ when the line is heated up. The other of these hot positions (HOT″) is shown as a dot-dash line and represents the position of the pipe when the present invention is employed. Thus if the portions of the pipe line between point A and the turbine connections 24 were able to move independently of the remaining portions with the increase in temperature and pressure the point A would move to A″. In the present invention the force-exerting unit 46 is arranged to prevent this point from moving to position A′ (which it naturally wants to assume) and to move it to position A″ which it ought to assume to relieve the stress at turbine connections 24 when the line is warming up and is at its operating temperature.

Figure 7:
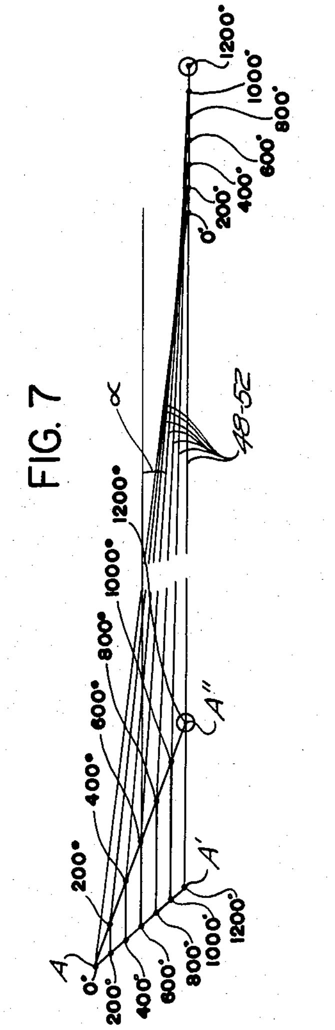
FIG. 7 is an enlarged drawing of the paths of movement of the point at which the external force is applied.

FIG. 7 is an enlarged view of the triangle A—A′—A″ and shows how the force is applied by the unit 46 for the various warm-up temperatures between room temperature. For example, at a pipe temperature of 600° the point A would of its own accord assume a position indicated by that temperature on the line A—A′, whereas in order to minimize the force at the turbine connections 24 for that temperature point A ought to be at the place indicated by that temperature on the line A—A″. This would require that the force be exerted along the line defined by these two position. However, in order that the force be exerted exactly along the line A′—A″ at the operating temperature it is exerted at a slight angle to the proper line at this intermediate temperature and similar slight angles for the other intermediate temperatures. To minimize these angles the rod 48 is made relatively long.

Although the lines A—A′ and A—A″ are shown as straight lines in FIG. 7 it will be understood that they may have some other form. For example, they may be curved or irregular. The exact form may be determined by calculating the position A for each temperature up to the operating temperature. If the exact form of the line A—A″ cannot be approximated by a straight line then a special switching device 58 is required. The device shown in FIG. 5 is substantially linear. It could be made non-linear by interposing a cam between the bellows 142 and lever 120.

Figures 8, 9:
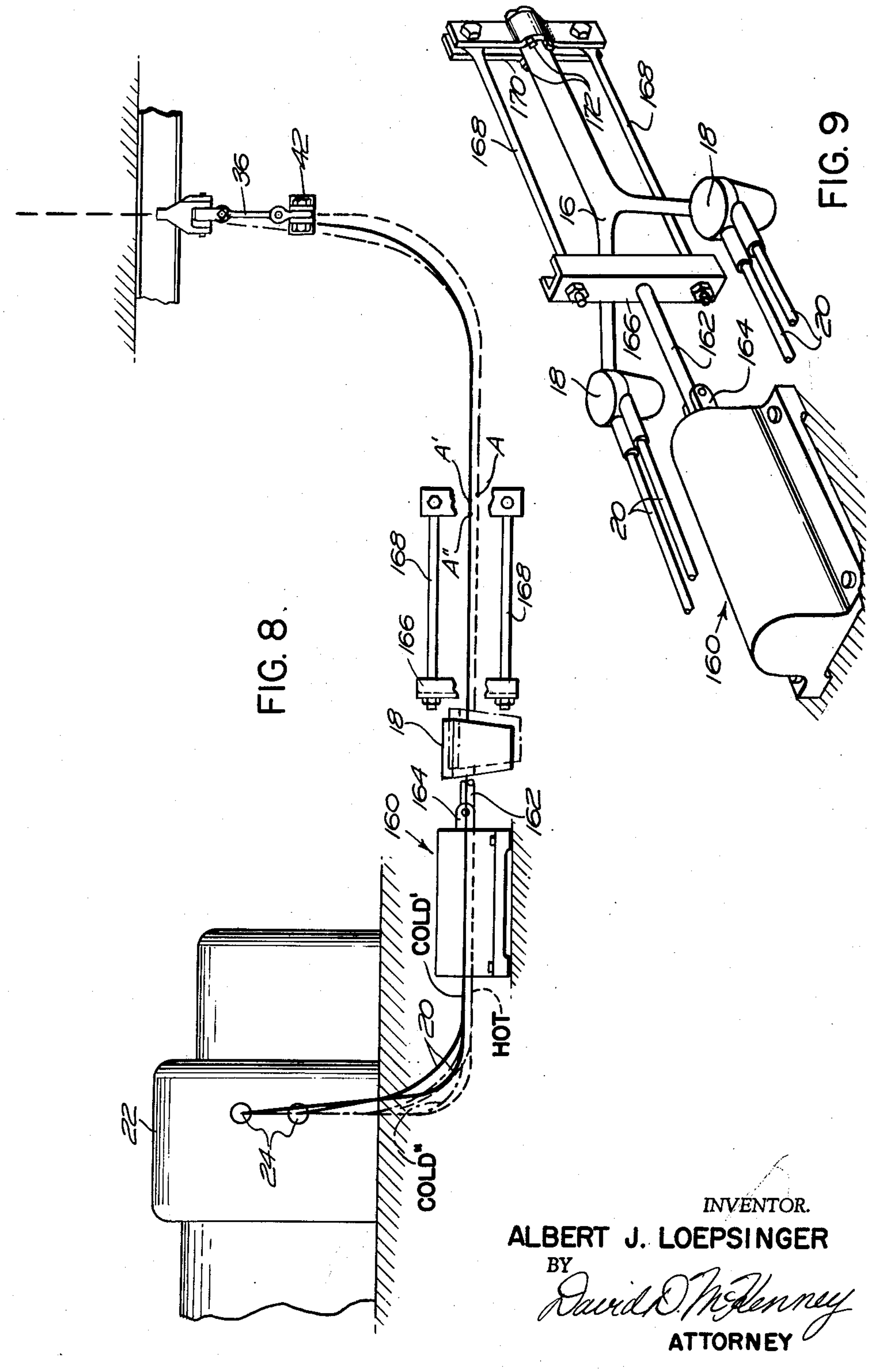
FIG. 8 is a diagrammatic view like FIG. 2 illustrating the direction of application of the force when the piping system is installed with cold pull.
FIG. 9 is a perspective view of a portion of the arrangement shown in FIG. 8.

FIG. 8 shows an enlarged diagrammatic side elevation view similar to that of FIG. 6 but in which the "cold pull" technique is employed. Thus for example, the solid line in FIG. 8 represents the pipe line in cold position (COLD′) when the method and means of the present invention are not being employed. The dot-dash line represents the cold position (COLD″) when the invention is being employed, the dotted line represents the hot position of the pipe. The point A′ shows the position of the point of attachment of the force-exerting unit 160 to the pipe line if the pipe were installed with cold pulling but without the employment of the present invention. The position A shows where this connection point would be located after the line was heated up to operating temperature. This latter position is that in which there would be no forces exerted on the turbine connections 24 because of the use of cold pulling technique. Position A″ represents the location of the connection of the unit 160 to the pipe line when the method of the present invention is employed with a line which has been installed with cold pulling. Thus the force-exerting unit 160 is disposed and actuated so that in the cold position of the system the portion of the line between the point of connection and the header is further stressed. The result is freedom from stresses between this point and the turbine and therefore at the turbine connection 24. Thus comparing FIGS. 6 and 8 it is seen that use of the present invention on a pipe line which has been installed with cold pulling involves what is essentially a reversal of the direction of the force exerted when the line is installed without cold pulling. In addition of course the maximum force is applied with cold pulling when the line is cold whereas in the arrangement of FIG. 6 which has no cold pulling the maximum force is applied when the line is hot.

In FIGS. 8 and 9 the force exerting unit 160 is located to the left of the branch 16 and has a rod 162 pivotally connected to its reciprocating member 164. The opposite end of this rod 162 is connected to the middle of a cross bar 166 the ends of which have secured to them the ends of a pair of rods 168 the other ends of which are in turn secured to a pipe clamp 170. Small lugs 172 are welded to the pipe for this clamp 170 to bear against in the usual fashion. This harness arrangement enables the force exerting unit 160 to be arranged axially with respect to the portion of the pipe line on which it acts, although it will be understood that a pair of such units could be employed one on either side and each exerting half of the required force. No controls are shown in FIGS. 8 and 9, but it will be understood that controls such as those shown in the earlier figures would be used.

FIG. 5 of the drawings shows a switching device which is actuated by changes in the temperature of the pipe line through the expansion and contraction of a fluid maintained at the same temperature as the pipe line. It will be understood however that there are other well-known ways of detecting such temperature changes and of using them to operate switches which other ways may be employed in this invention. For example, the temperature of the pipe line may be measured by a thermocouple with the resultant changes in voltage suitably amplified and employed in the operation of the switches controlling the motor.

Figures 10, 11:
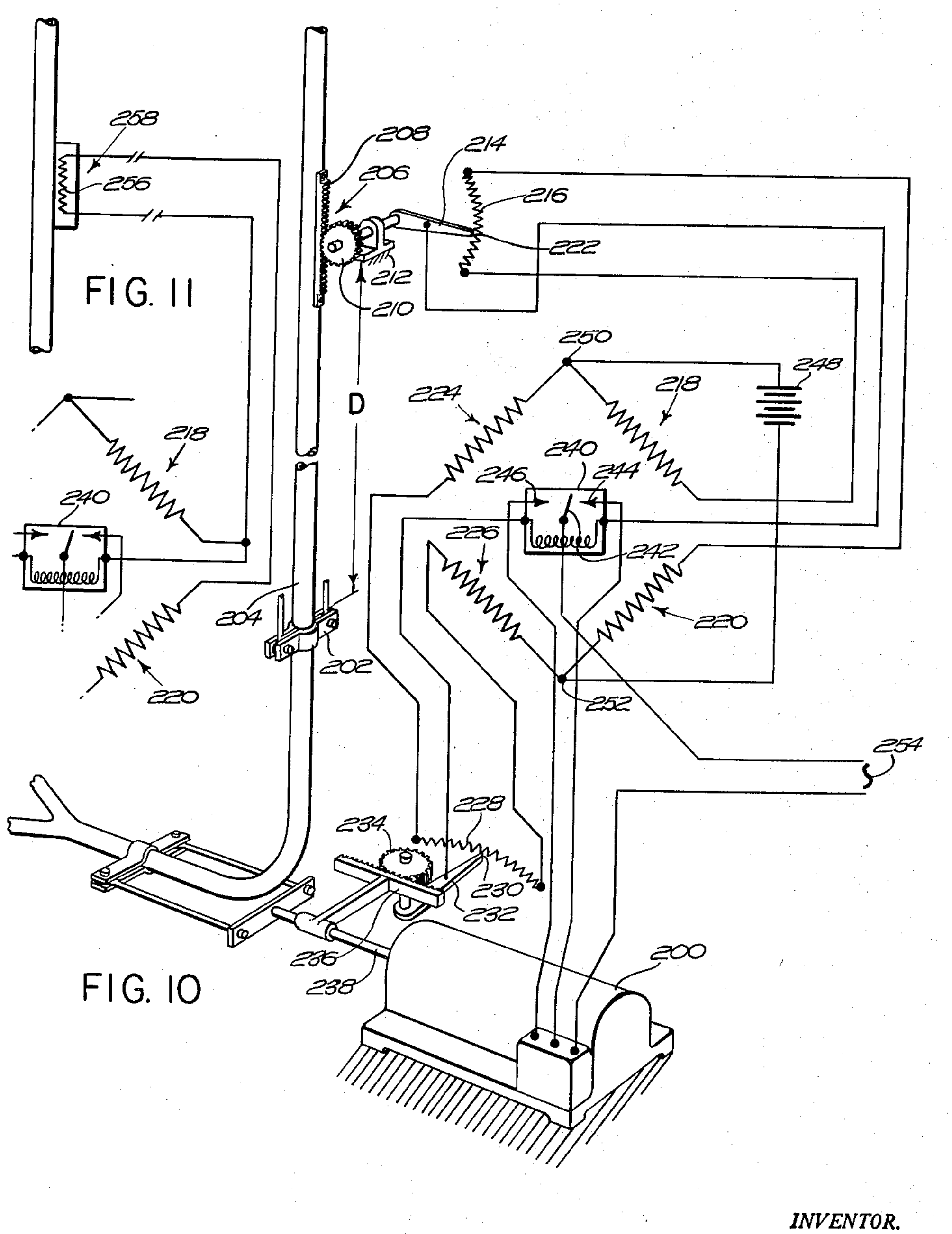
FIG. 10 is a diagrammatic view, partially in perspective showing another form of control for the force exerting unit shown in FIG. 1.
FIG. 11 is a fragmentary view of another form of control for the force exerting unit of FIG. 1.

FIGURE 10 shows another arrangement for controlling the operation of a force exerting unit 200 in accordance with changes in pipe temperature. Inasmuch as the pipe is secured to building structure by clamp 202, the vertical pipe portion 204 extending upward from this clamp will increase in length with increases in temperature in an accurately predictable manner. At a point 206 a substantial distance D from the clamp the pipe will move significant amounts within the temperature range. In the arrangement of FIG. 10 this movement is employed to control the unit 200. Thus through a rack 208 on the pipe at point 206 movement of the pipe at this point turns a pinion 210 rotatably mounted to fixed building structure 212. The pinion in turn drives the armature 214 of a rheostat 216 which is located partially in one leg 218 of a Wheatstone bridge and partially in another leg 220 of this bridge. Movement of the armature 214 along the rheostat 216 changes the proportion of the latter in each leg inasmuch as the point of contact 222 of the armature on the rheostat constitutes the junction of the two legs.

On the other side of the bridge formed by two other legs 224 and 226 there is a corresponding rheostat 228 engaged at a point 230 (which constitutes the junction of these two legs) by an armature 232 driven by a pinion 234 which is in turn driven by a rack 236 carried on the shaft 238 of the force exerting unit 200.

Connected between the bridge junction points 222 and 230 is a galvanometer relay 240 with an armature 242 and front and back contacts 244 and 246. Current through this relay in one direction causes armature 242 to engage the front contact 244 which completes a circuit to the reversible motor of the force exerting unit 200 and turns this motor on to drive the shaft 238 in one direction. Current through the relay in the other direction causes armature 242 to engage the back contact 246 which completes a circuit to the force exerting units reversible motor and turns this motor on to drive the shaft 238 in the opposite direction.

The operation of this equipment is as follows: Initially the armatures 214 and 232 are set so that the bridge circuit is balanced and no current flows through the galvanometer relay 240. In this condition the relay armature 242 is not in engagement with either of the contacts 244 or 246, and hence the motor in the force exerting unit 200 is turned off. A change in temperature of the pipe line moves the rack 208 thereon relative to the pinion 210, rotating the armature 214 and unbalancing the bridge. When the unbalance reaches a predetermined amount the galvanometer armature 242 is moved into engagement with the contact (244 or 246) which turns on the motor in that direction which moves the rack 236 to rebalance the bridge through pinion 234 and armature 232. Such rebalance stops the flow of current through relay 240, opening the motor circuit and thus turning off the motor. By changing the ratio of the diameters of pinions 210 and 234, the relative lengths of the armatures 214 and 232 and the values of the rheostats 216 and 228 any given movement of the shaft 238 (within reasonable limits) can be obtained for a given movement of the pipe point 206. In a usual case there would be a fixed ratio of movement throughout the range of temperatures.

A battery 248 is shown as the source of energy for the bridge circuit and is connected across the remaining bridge junction points 250 and 252.

The motor receives its energy from a separate source 254.

FIGURE 11 shows another embodiment of a bridge circuit control similar to FIG. 10 in the omitted parts. In FIG. 11 a resistor 256 is mounted on the pipe at a point 258 and is located entirely within the leg 220 of the bridge circuit. As the pipe temperature changes the resistance of resistor 256 is changed, unbalancing the bridge. Balance is restored in the same way illustrated in FIG. 10. With this arrangement the resistor 256 does not have to be located at a point which moves in a predictable manner with changes in temperature. It is necessary, of course, that the resistor 256 be of a material the resistance of which changes significantly over the temperature range of the pipe. An example of such a resistor material is wire made with tungsten.

Earlier in the specification reference was made to the minimizing of stresses by this invention at the turbine end of the pipe line and at the boiler end of the pipe line. In the subsequent description the invention was explained with particular reference to the turbine. It was pointed out that the forces at the connections of the turbine leads to the turbine could be kept small (the turbine manufacturer sets limits on what these forces can be) by preventing the force resulting from thermal expansion of the pipe line from being exerted on these leads. Movement of the end of the pipe line by a force exerting unit rather than mere fixing of this end is necessary because of the expansion and contraction of the turbine leads themselves each of which has one of its ends connected to the substantially stationary turbine.

In the case of the turbine it has been found that the common end of the turbine leads where they are merged and connect to the pipe end moves in such a way with changes in temperature that both the location of this common end and the orientation of its axis can be matched by the location of the pipe end and the orientation of its axis with the use of a single force exerting unit when a special pipe anchor is also employed. Thus it will be appreciated that in order to keep forces from being transmitted by the pipe through these turbine leads to the turbine it is necessary not only for the force exerting unit to move the pipe end to the new location of the common end of the turbine leads, but it is also necessary that the axis of the pipe end be coaxial with the common end of the turbine leads at the new location.

A single force exerting unit connected to the pipe end will properly change the location of this end in accordance with expansion of the turbine leads and at the same time will maintain the proper orientation of the axis of the pipe end with respect to the axis of this common turbine leads end during the temperature changes because of the employment of the anchor clamp 42.

Thus in the case of the turbine it is so important to keep the forces on its connections below very small values that it is customary to fix a point on the pipe line against movement in at leas one direction by connecting this point to the building frame. Such an anchoring is illustrated by the clamp 42 in FIG. 1 of the drawings. This anchor point is preferably located substantially at the level of the connections of the turbine leads to the turbine with the result that there is only a small vertical portion of the pipe line between this anchor and the turbine, which vertical portion is of substantially the same length as the vertical portions of the turbine leads themselves so that the vertical expansion of the leads is substantially equal to the vertical expansion of the vertical pipe portion. This maintains the horizontal pipe portion between the clamp and the turbine at substantially the same orientation as the common end of the turbine leads with changes in temperature and this result plus the small vertical movement of the horizontal pipe portion makes it possible to practice the present invention with only one force exerting unit.

In the case of the end of the pipe line adjacent the boiler, however, it may be necessary to employ more than one force exerting unit in order to minimize the forces transmitted from the expanding pipe line to the superheater header. The reason for this is that it is not always possible to employ a fixed anchor for this end of the pipe line which would correspond to the clamp 42 in FIG. 1 but which would be so located with respect to the connection of the pipe to the superheater header that a single force exerting unit applied to the pipe line near the header would be able to maintain the proper location and orientation of the pipe end connected to the header. Where it is possible to use such an anchor clamp at the boiler end of the pipe line this would probably be done because the control system would be less complex and less expensive. This would result in a form of the invention like that shown in FIG. 1.

In a piping system of the configuration shown in the drawings it would be most likely that the turbine end would be provided with the arrangement shown, namely an anchoring clamp and a single force exerting unit. This in itself would make the use of an anchor clamp at the boiler end of the pipe line difficult, because although the problem is the same a clamp 42 is already employed at the lower end of the long vertical pipe portion, and it would not be desirable to locate a second similar clamp near the upper end of the line. The reason for this is that such a second clamp, located for example near the top of the long vertical pipe portion, would result in the fixing of two ends of this vertical portion against vertical movement and the expansion of the pipe material between the clamps would result in stresses which would be excessive even for the pipe. A pipe line of a different configuration, for example one in which there is a large expansion bend between such clamps might permit the use of a second clamp in the manner described, but it is one object of the present invention to eliminate such expensive expansion bends.

In addition the use of a second clamp is particularly difficult in view of the upward motion of the header itself, due to the expansion of the boiler tubes connected to the header, which motion would necessitate the location of the second clamp at such a point on the vertical pipe portion (in order to permit the employment of only one force exerting unit) that the two fixed clamps on the vertical portion would be even closer together. In other words because of the upward movement of the header the second clamp to correspond in function to the clamp 42 would have to be located on the long vertical pipe portion that the expansion of the vertical portion above it would equal the upward movement of the header and the expansion of the short vertical portion leading down into the header.

Because a second anchor clamp is not feasible in a piping arrangement like the one shown it is not usually possible to move the pipe end to the desired location and at the same time cause it to be coaxial with the header connection with only one force exerting unit applied to the pipe line at a point spaced from its connection to the header. Therefore in accordance with the present invention and in order to both achieve this proper location and orientation so that no forces are transmitted from the pipe line to the header one or more additional force exerting units may be required to achieve the proper result.

Figures 12, 13, 14, 15:
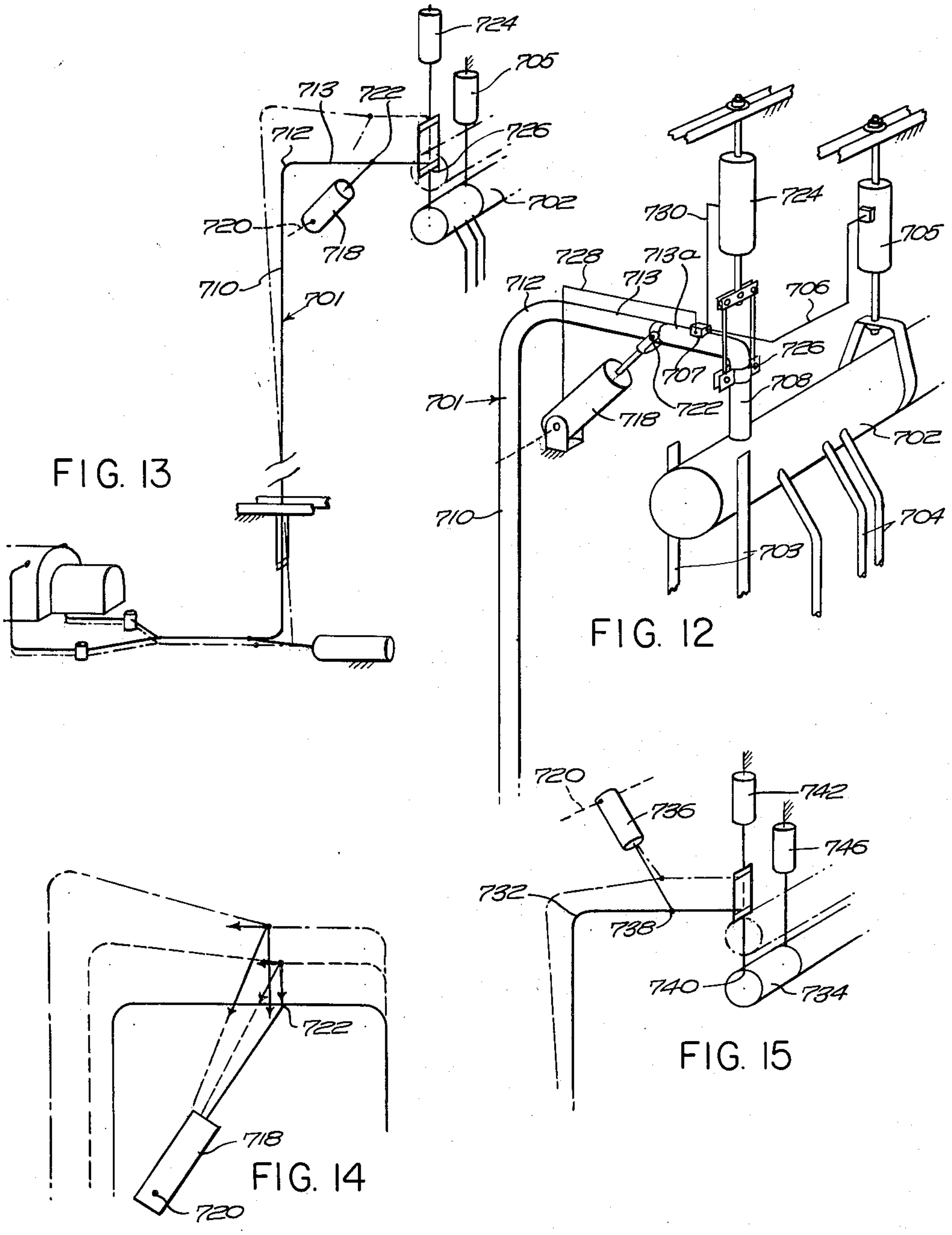
FIG. 12 is a simplified perspective view of the end of the pipe line at a boiler superheater header showing another form of the present invention.
FIG. 13 is a diagrammatic view similar to FIG. 1*a* but in perspective and also showing the form of the invention in FIG. 12.
FIG. 14 is a fragmentary view taken from FIG. 13 and showing the direction of force exertion by one of the force exerting units at three different temperatures.
FIG. 15 is another fragmentary view similar to the upper portion of FIG. 13 but showing the location of force exerting units in the case of a pipe line which expands differently.

Referring now to FIG. 12 this is a view similar to the upper portion of FIG. 1 and shows the arrangement of the pipe and superheater header, here number 701 and 702, respectively. The boiler casing and some other boiler structure shown in FIG. 1 have been omitted from FIG. 12. Guides 703 which guide vertical movement of the header 702 and some of the boiler tubes 704 which lead downwardly from the underside of the header are shown. A force exerting unit 705 suspended above the header from fixed structure is connected to the header and aids in the vertical movement of the header necessitated by the expansion and contraction of the boiler tubes 704. Thus although these tubes expanding from increases in temperature exert upward force on the header it is not uncommon for there to be sufficient friction at the guides 703 and in any constant support devices which may be employed for supporting the weight of the header to resist the upward motion of the header. The force exerting unit 705 makes sure that any such friction is overcome and that the header is moved to that position in which the tubes are substantially free of stress. The proper header positions for each temperature are determined in advance and are achieved by correlating the operation of the unit 705 with the various temperatures of the system through a control lead 706 connected to a temperature unit 707 in the same manner as the force exerting unit at the turbine is controlled (see unit 46 in FIG. 1).

FIG. 13 illustrates more diagrammatically the cold and hot positions of the pipe line and header. The solid line in FIG. 13 represents the position of the pipe line 701 when the system is shut down and is at room temperature, and the dotted lines represent the position of the pipe line and of the header when the system is at operating temperature. For purposes of illustration the movement of the pipe line and header between cold and hot positions may be exaggerated. As in the case of the end of the pipe line adjacent the turbine, the objective at the end of the pipe line near the header is to isolate from a small portion 708 of the pipe line leading directly into the header forces which would otherwise be imposed on this portion (and through it on the header) by the expansion of the pipe line leading to this portion.

It will be noted that the long vertical portion 710 of the pipe line is shown to have increased its length between cold and hot positions so that its upper end at bend 712 moves upwardly to a greater extent than the upward movement of the header 702. In addition the horizontal portion 713 of the pipe line between this bend 712 and the header increases in length whereas the header in its guided path moves only vertically. Without the present invention the result of these expansion movements of the pipe and of the header would be that the pipe would try to lift the header and push it to the right in FIG. 13.

A force exerting unit 718 pivotally mounted on fixed structure around an axis 720 and connected to the pipe at 722 is provided to counteract these forces exerted by the expanding pipe on the header. Thus in the dotted pipe position in FIG. 13 the force exerting unit 718 holds the point 722 in such relation to the header 702 that the length of the horizontal portion 713*a* (FIG. 12) between point 722 and the header is permitted to expand without imposing force to the right on the header and at the same time this force exerting unit 718 maintains the vertical portion 708 vertical.

In thus locating the point 722 the force exerting unit 718 necessarily introduces a downward pull on this point which is partially transmitted to the portion 708 and through it to the header and in order that the portion 708 be relieved of this force a second force exerting unit 724 is connected to the pipe at point 726 and exerts force in an upward direction to neutralize the downward force introduced by the unit 718.

Both the units 718 and 724 are programmed in accordance with the temperatures of the system, it having been determined in advance where the points 722 and 726 should be moved to with each increase in temperature. Thus referring back to FIG. 12 leads 728 and 730 extend from the temperature control element 707 on the pipe to the force exerting units 718 and 724, respectively. More particularly, the programming of the force exerting units 705, 718 and 724 involves the advance determination as to where the holder, the point 722 and the point 726 should be at each warm-up temperature (and, most important, at the operating temperature), allowing for the thermal expansion of the tubes 704, the thermal expansion of the pipe portion 708 and of the pipe portions between points 722 and 726. The operation of each force exerting unit is then controlled in the manner illustrated in FIGS. 5, 10 or 11 to produce the desired movement with each temperature change.

FIG. 14 is another diagrammatic view illustrating vectorially the directions of the forces which the unit 718 is required to exert for several positions of the system within the temperature range. This figure shows that the location of the pivot axis 720 for the unit 718 is selected so that the unit is exerting its force in substantially the proper direction for each temperature, recognizing that it may be impossible with a pivotal mounting for the unit 718 to have it exert its force in exactly the proper direction for each such temperature. By locating this pivotal axis 720 at a substantial distance from the point 722 a good approximation for the proper direction may be achieved in each case. It is preferred to so locate this axis that the minimum directional error, if any, is present at the upper end of the temperature range. The relative vectorial values indicated by the lengths of the arrows are merely for the purpose of illustration. The actual values would depend upon the conditions of each case.

FIG. 15 is another diagrammatic view illustrating the case in which the movement of the pipe line and the movement of the header are such that the bend 732, corresponding to the bend 712 in FIG. 13, has less upward movement than the header 734. In such a case a force exerting unit 736, corresponding to the unit 718 in FIG. 13, is pivotally mounted so as to lift a point 738 higher than the bend 732 would otherwise permit it to go. At the same time of course the unit 736 introduces a horizontal component of force on the point 738 which helps to prevent the pipe from imposing a force to the right on the header connection 740. In this case the unit 736 introduces a vertical component upwardly on the connection point 740 and another unit 742 which in this case exerts a downward force is included to neutralize this component. Again a unit 746, corresponding to the unit 705 in the earlier figures, is employed to assure that the header moves the proper amount to safeguard the tubes connected to it.

In the above embodiments, the force exerting units may be responsive to changes in temperature either directly by a thermostatic control or indirectly by movement of the pipe caused by the change in temperature, to force the pipe segments adjacent the boiler and turbine connections to positions at the changed temperature in which the stresses on the connections approximate those stresses which would exist if such segments were disconnected from the remainder of the pipe at such changed temperature. Thus, they isolate the connections from the affects of pipe growth due to the temperature change so that the stresses on the connections during such temperature change are kept at a low value. Consequently if desired the length of the piping system can be substantially decreased as compared to conventional systems, because the flexibility achieved by a relatively long conventional piping system to insure against excessive stresses on the connections is not required.

However, the present invention can also be used to advantage in conventional systems which are long enough to provide the flexibility referred to. In such cases, it can be used in the manner described above or it can be used merely to insure that the line is moved to the location which it is designed to move to at the increased temperature (hereinafter referred to as calculated location). In the latter case, the stresses at the connections due to affects of pipe growth are accepted.

Thus, the location of the pipe as a result of movement of the pipe over the expected temperature range due to expansion and contraction can be calculated by techniques well known in the art based on the pipe specifications, the connections to building structure, and the auxiliary apparatus associated therewith. The system is designed so that at this calculated location the stresses on the connections are below maximum allowable stresses. However, such calculations must assume a number of things including uniform expansion of the pipe, uniform deformation of the pipe and pipe bends and that the piping system is weightless (which assumes perfect support by the hangers supporting it). As a matter of fact, the pipe cannot be relied to expand and deform uniformly due to differences in shape, material, fabrication, etc. The effect of these non-uniformities on the system is impossible to calculate. Also, some hanger friction or improper hanger setting is apt to occur with the result that the weight of the pipe is either undersupported or oversupported. Again, the exact effect of this on the system cannot be calculated. Due to these uncalculatable factors, the actual position of the piping system at the elevated temperature may differ substantially from that calculated, and consequently, the stresses on the connections may exceed the maximum permissible stress recommended by the manufacturers.

Figure 16:
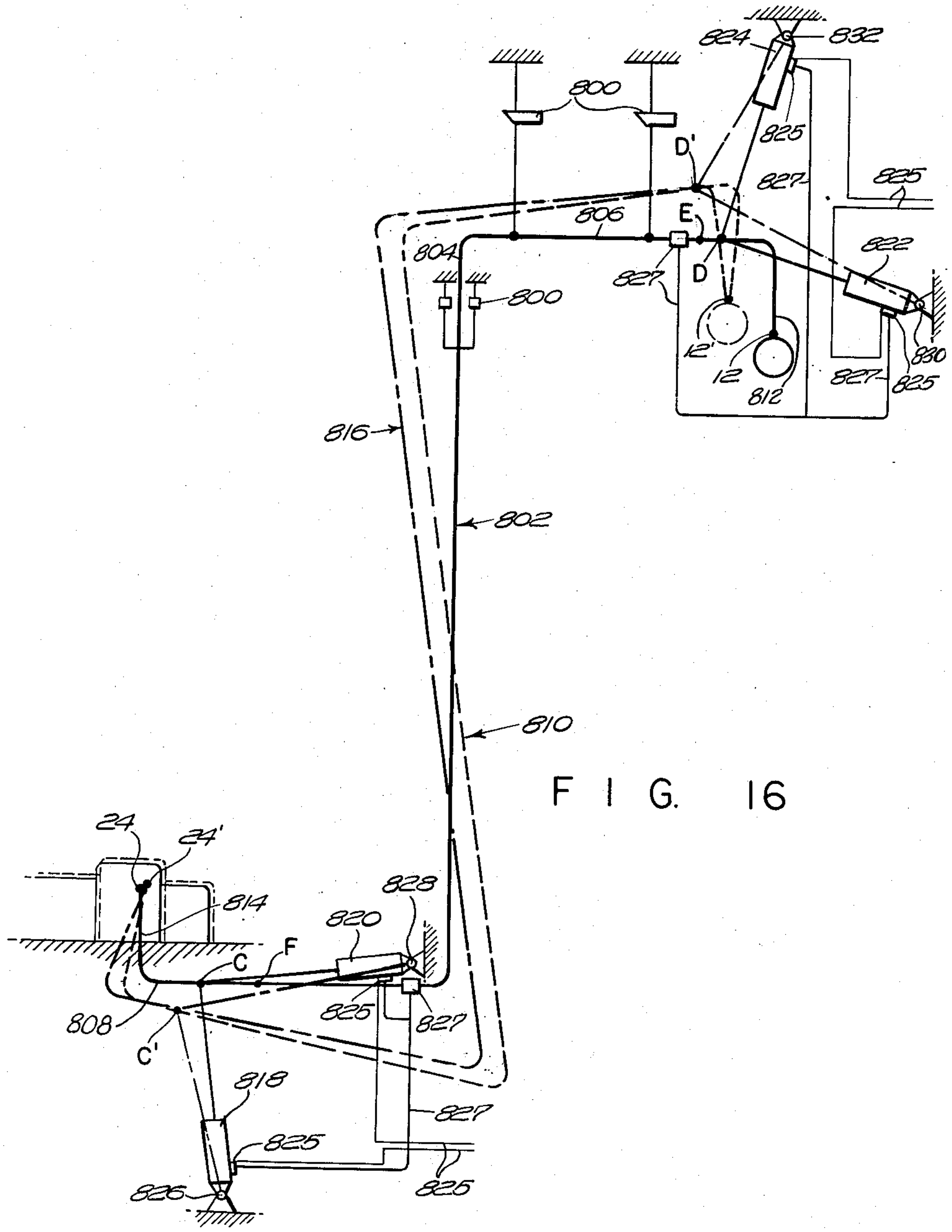
FIG. 16 is a diagrammatic view showing a pipe system layout similar to that of FIG. 1 and illustrating another embodiment of the invention in which the piping system is forced to assume its calculated (dotted) position.

This is demonstrated diagrammatically in FIG. 16 in which the piping system supported by constant support hangers 800 is shown diagrammatically as heavy lines. The solid line 802 represents the piping in the cold position having a central vertical section 804 and two horizontal sections 806 and 808. The dotted line 810 represents the calculated position of the piping in hot condition. It is assumed that the turbine and boiler connections 24 and 12, respectively, move to positions 24′ and 12′ at the elevated temperature. These movements do not accommodate the expansion of the piping system and that is why the system assumes the deformed position shown by the dotted lines which is the calculated position. However, because the piping in practice is relatively long (although a short line is shown here for purposes of illustration) and has a number of bends therein (many more than are shown) it is relatively flexible, so that the stresses on the connections are below maximum permissible stresses in spite of the deformation in the calculated position. The system is deliberately and conventionally designed in this way.

The dot-dash line 816 represents the hot position which the piping might assume due to the non-uniformities and other factors referred to above. Because of these, pipe segment 814 has been forced to tip farther to the left than calculated which probably increases the stress on the turbine connection 24. At the same time, pipe segment 812 has also been forced to tip farther to the left than calculated which may increase or decrease the stress on the connection 12. The advantage of forcing the piping system to its calculated position is that the user knows that the stresses on the connections will be within satisfactory limits.

In accordance with the embodiment of the present invention shown in FIG. 16, force exerting units 818 and 820, which are responsive to temperature changes, apply forces to point C to force the segment 814 to move to its calculated position as shown in dotted lines at the changed temperature. Similarly, force exerting units 822 and 824 which are responsive to the same temperature changes, apply forces to point D on the piping system to move the segment 812 to its calculated position as shown in dotted lines at the changed temperature.

The important thing is to maintain the pipe segments 812 and 814 at their calculated positions because the critical stress points are at 12 and 24. It is much less important to maintain the intermediate portion of the piping system at its calculated position. Accordingly, if in FIG. 16 the units 818–824 should not maintain this intermediate portion in its calculated position, although it is assumed in FIG. 16 that they would, no harm is done. If desired, additional force exerting units can be connected to the intermediate portion to maintain it exactly in the calculated position.

Although FIG. 16 shows the force exerting units applied at the points C and D, they may be applied at other points along the system so long as they are effective to maintain the pipe segments 812 and 814 at approximately their calculated positions.

The force exerting units 818–824 and the controls 825 and 827 for controlling them in response to changes in temperature are the same as those shown in FIGS. 1 to 15, particularly FIGS. 5, 10 and 11. The difference is that the switch mechanisms and the force applying units are adjusted and located to force the segments 812 and 814 to assume their calculated positions over the temperature range rather than positions in which the connections 12 and 24 are rendered substantially stress-free over the temperature range as shown in FIGS. 1–15. The units 818–824 are mounted on the building structure at 826, 828, 830 and 832, respectively, preferably by universal joints, and similarly, these units are attached to the pipe (at C and D) preferably by universal joints to allow for pivoting in the plane of major movement (plane of the paper) and to allow for slight movement in other planes.

The force exerting units 818–824 control the movement of points C and D by changes in their lengths between their points of attachment to the building and pipe, the switch arrangements being such that for each temperature over the range of temperatures, each unit has a definite length. Consequently, for each temperature the point C is forced to assume a predetermined position in space with respect to the building where the arcs of the two lengths of units 818 and 820 around pivots 826 and 828 intersect. The same is true with respect to point D.

Figure 17:
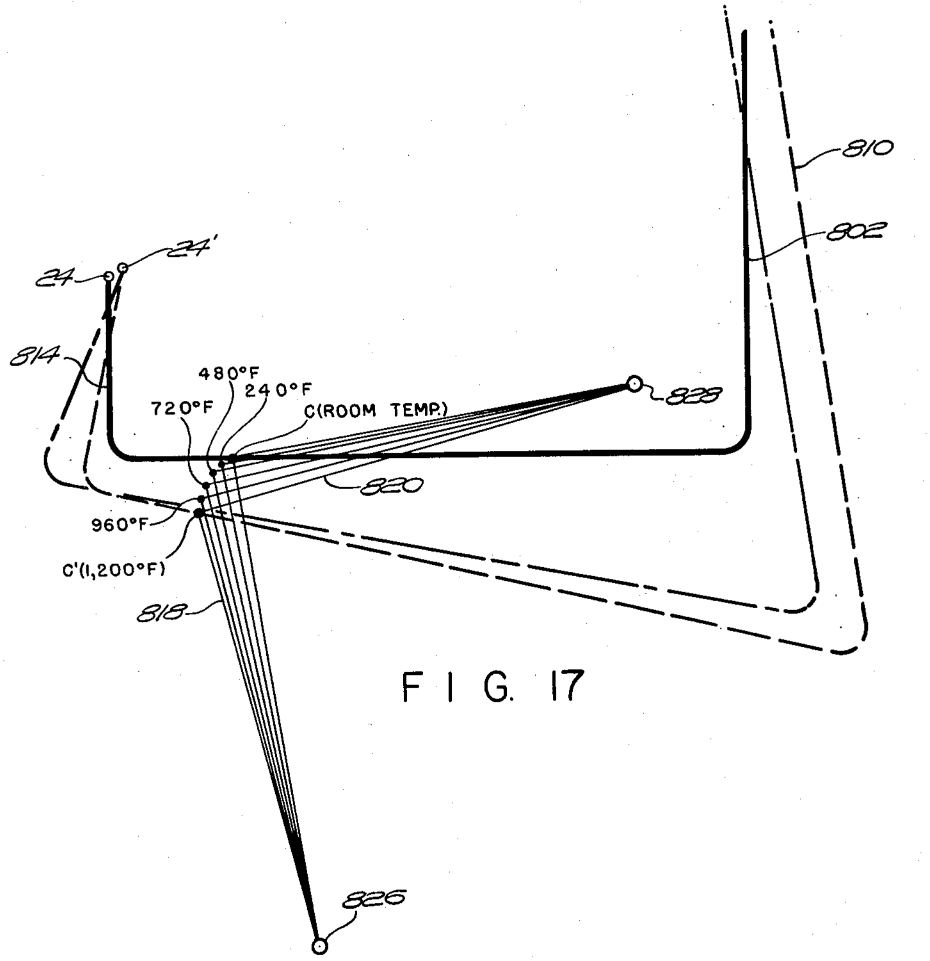
FIG. 17 is an enlarged diagrammatic view of the lower end of the pipe line of FIG. 16, showing how the movement of a portion of the pipe is forced to follow the path defined by the calculated positions over the temperature range.

This is demonstrated in FIG. 17 which shows the calculated path of point C as C—C′ over a range of temperatures from room temperature to 1200° F. Note that at each temperature shown, the location of point C is determined by the respective lengths of 818 and 820.

Although in FIG. 16, movement of points C and D is controlled in a single plane, the invention contemplates simultaneous control in one or more different planes. This would be provided by applying three force applying units to each of the points C and D, the third such unit exerting force in a direction at an angle to the plane of the paper in FIG. 16. It is apparent that by selecting a proper location for the point of attachment to the building of each of the three force exerting units relative to the desired path of movement of the point C (or D), its position in space at each temperature can be completely controlled in all directions.

Figure 18:
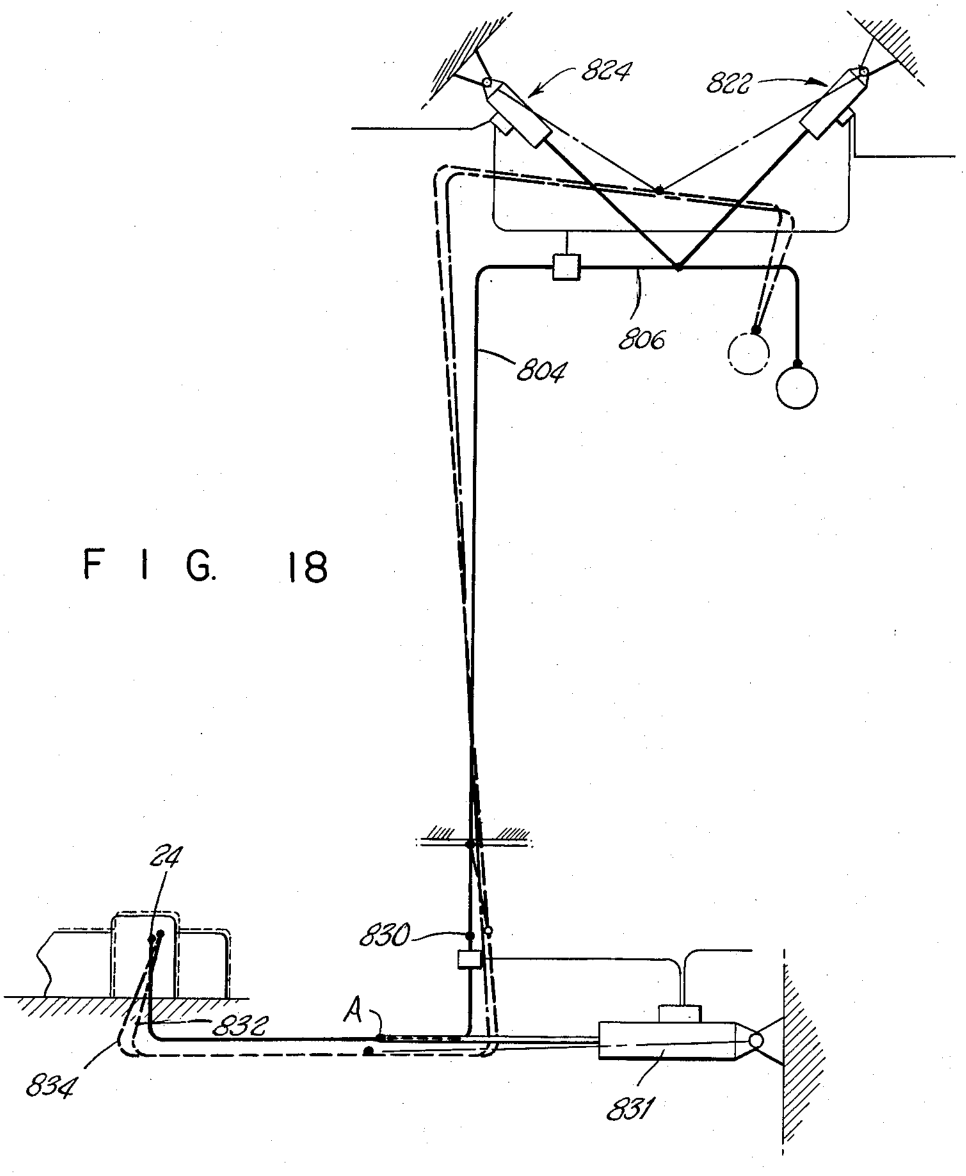
FIG. 18 is a view like FIG. 16 but showing the pipe line anchored at an intermediate point.

FIG. 18 is like FIG. 16 except that the vertical segment 804 is vertically anchored at 830 in the same manner as in FIG. 1 which permits the use of a single force exerting unit 831 to control movement of the lower portion of the piping system, such single unit being arranged in the same general way as the single force exerting unit 46 of FIG. 1 except that the switch mechanism thereof is arranged to force the section of the pipe between point A and the turbine connection 24 to its calculated position shown in dotted lines 832 and prevent it from moving to the position shown in dot-dash lines 834 which it might otherwise assume.

It is understood, of course, that in FIGS. 16 and 18 where the system is forced to assume its calculated position, the length of the system must be great enough, as in conventional practice, to provide sufficient flexibility so that the stresses on the terminal connections are safe in such calculated position, although the system is shown in each of these figures with the same short length of FIG. 1 for simplicity of illustration. As explained earlier the FIG. 1 embodiment permits a shorter length than conventional because the stresses are reduced by the use of the force applying mechanisms to values even less than those for the calculated position of such system, e.g. zero if possible, and consequently the flexibility provided by a longer line is not required to achieve safe stresses at the terminal connections.

FIGS. 16 and 18 merely illustrate that the actual location of the piping system may differ from the calculated location at elevated temperatures and are not intended to show the actual effect of temperature increases on a line of this configuration in the cold position. The assumed thermal effects have been greatly exaggerated for purposes of illustration.

Figure 19:
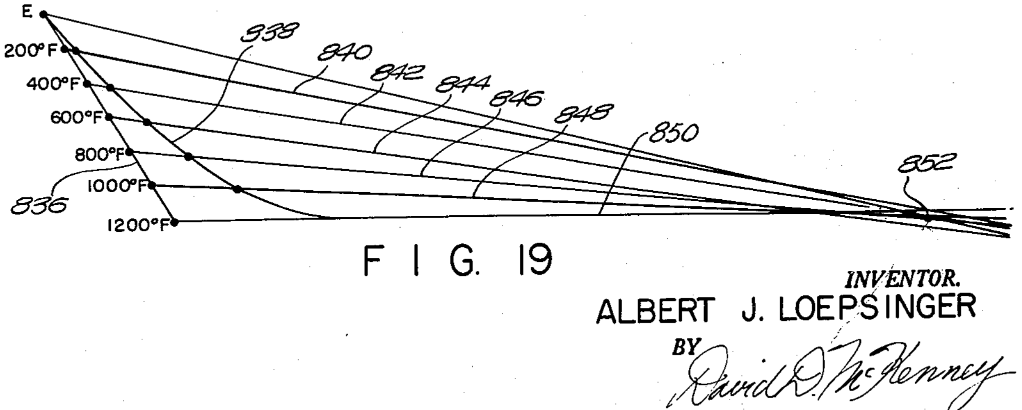
FIG. 19 is a view like FIG. 7 but showing another way of selecting the point of attachment to the building structure of a single force exerting unit.

Although FIG. 7 shows one way of determining the location of the point of attachment of the force applying unit to the building structure when a single unit is used, the location of such point of attachment can also be determined in the manner illustrated in FIG. 19. Thus, whereas in FIG. 7 this point of attachment is so located that it lies on the line defined by the controlled and uncontrolled locations of the point on the pipe where the force is applied, at the highest temperature, in FIG. 19 the point of attachment is selected so that it is as close as possible to substantially all such lines within the temperature range. Thus, for example, in FIG. 19 the line 836 illustrates the uncontrolled path of the point E to which the force is to be applied without any force exerting unit, the various locations of E for temperatures over the temperature range being noted. The line 838 illustrates the desired path with the corresponding positions over the temperature range again being noted. Extensions 840–850 of lines connecting the corresponding positions on lines 836 and 838 do not intersect at a common point. However, point 852 at which a single force exerting unit is to be connected to building structure is that point which is closest to the extensions of substantially all these lines. In this way, error introduced because the force is not being exerted in exactly the right direction is minimized over the temperature range. In FIG. 7, a greater error is accepted at the lower temperatures in order to obtain greater accuracy at the higher temperatures at which the system will operate and at which effects of expansion and contraction would be expected to be greatest.

Where the term "responsive to temperature change" or similar language is used herein, this includes a direct temperature responsive thermostatic type of device such as the one shown in FIG. 5 and an indirect temperature responsive device such as that shown in FIG. 11 in which movement of the pipe due to temperature change is employed. In both cases the force exerting unit responds to a change in thermal condition of the pipe of which the change in temperature is a manifestation.

If conditions permit a single force exerting unit can be used to control the movement of point C or D in FIG. 16 or two or more units may be connected to the pipe line at spaced apart points as shown in FIG. 12.

Any of the embodiments shown in FIGS. 1 to 19 may be used either to force the pipe line to assume its calculated position or a position other than calculated and in which the connections are rendered substantially stress-free or more stress-free than would be true of calculated position or any other desired position by arranging the switches accordingly and if necessary, relocating the points of attachment of the units to the building structure.

Although the force exerting units described above comprise an electric motor driving a screw jack, a hydraulic unit can be used comprising a hydraulic piston and cylinder arrangement, a pump for operating such arrangement and a motor for operating the pump.

By providing another pair of force exerting units like 822 and 824 to apply a force to a point E spaced a distance from point D to force point E to move to its calculated position at the same time that point D is moved to its calculated position any tendency of the piping system to pivot about the point D with resultant movement of the portion of the system between D and 12 away from its calculated position will be avoided. The same with respect to applying a force to the point F in FIG. 16 at the lower portion of the piping system.

Although changes in temperature of the system are used in the above descriptions to control the force applying mechanisms, it will be understood that other changes in the condition of the system which may be unrelated to temperature change may be used depending upon the application of the invention.

It is also understood that the external force may not only be applied to the piping but to any other fluid handling component or item in the system, such as boiler parts, etc.

Furthermore, it will be understood that in practice, the predetermined position may not be exactly achieved because of errors. Consequently, the term "predetermined position" or "predetermined location" as used herein includes acceptable errors and tolerances so long as acceptable results are achieved.

It is noted that in the above embodiments the controls for the force applying mechanisms control them with respect to a reference which is substantially unaffected by movement of the piping by the force applying mechanism. In the embodiments of FIGS. 1 to 9, the reference is the lever 120, in FIG. 5, the movement of which is unaffected by movement of point A on the pipe by the force applying mechanism. In FIG. 10 the reference is the lever 214 the position of which is unaffected by movement of the point A by the force applying mechanism. In FIG. 11 the reference is the resistor 266 which is unaffected by movement of point A by the force applying mechanism.

Also the controls for the force applying mechanisms are not responsive to changes in any weight supporting force on the pipe provided by the force applying mechanism due to a temperature change.

In all the above embodiments the control mechanism for controlling the force applying mechanism includes a movable member which moves in response to a temperature change independently of change in length of the force applying mechanism. Thus, it is not necessary to change such length to actuate the motor as is true in the constant supporting device described in U.S. Patent No. 2,248,730 although change in length is effective to turn off the motor. This member is lever 120 in FIGS. 1 to 9, the arm 214 or 242 in FIG. 10 and the arm 242 in FIG. 11. In all the embodiments this member moves with respect to a fixed point, which in FIGS. 1 to 9 is the pivot axis of lever 120, in FIG. 11 is the pivot axis of lever 214 or 242 and in FIG. 11 is the pivot axis of arm 242.

The term "energy valve means" (controlled coupling between the source of energy and the force applying unit), as used in the claims hereof, includes an electric switch or switches such as those shown in the drawings between the motor which drives the force applying unit and the source of electrical energy and any other kind of controlled coupling by which a supply of energy to the force applying unit is regulated or modulated in accordance with temperature changes.

The terms "position" and "location" as used herein with respect to the piping or any other portion of the fluid handling equipment are used interchangeably.

This application is a continuation-in-part of my copending application Serial No. 789,768 filed January 26, 1959, now abandoned which in turn is a continuation-in-part of my application Serial No. 712,862 filed February 3, 1958, now abandoned.

I claim:

1. Apparatus for controlling the position of at least a portion of fluid handling equipment subject to a change in position due to a change in a thermal condition of said equipment, said apparatus comprising means adapted to be operably connected to said portion and responsive to said change in thermal condition for applying to said portion external force to control movement of said portion to a desired position irrespective of the position change said portion would have had due to said thermal condition change without the application of said external force, energy valve means operably connected to said force applying means and adapted to be operably connected to a source of energy to control operation of said force applying means, and means operably connected to said energy valve means and responsive to said change in thermal condition to control said energy valve means, said last mentioned means correlating said desired position of said portion with said changed thermal condition.

2. Apparatus for controlling the position of at least a portion of fluid handling equipment subject to a change in position due to a change in a thermal condition of said equipment, said apparatus comprising means adapted to be operably connected to said portion and responsive to said change in thermal condition to apply force to said portion at said changed thermal condition substantially different than the force applied by said force applying means before said condition change, energy valve means operably connected to said force applying means and adapted to be operably connected to a source of energy to control operation of said force applying means and means operably connected to said energy valve means and responsive to said change in thermal condition to control said energy valve means, said last-mentioned means correlating said different force with said changed thermal condition.

3. Apparatus for controlling the position of at least a portion of fluid handling equipment subject to a change in position due to a change in a thermal condition of said equipment, said apparatus comprising force applying means adapted to be operably connected to said portion and movable in response to said change in thermal condition to restrict said portion against movement due to said change in thermal condition to any position substantially different from a desired position irrespective of the position change said portion would have had due to said thermal condition change without said restricting means, energy valve means operably connected to said restricting means and adapted to be operably connected to a source of energy to control movement of said restricting means and means operably connected to said energy valve means and responsive to said change in thermal condition to control said energy valve means, said last mentioned means correlating said desired position with said changed thermal condition.

4. A method for controlling the position of at least a portion of a piping system which is subject to a change in position due to a change in temperature, said method comprising applying to said system external force to force a portion of said system to assume a desired position at said changed temperature different than the position it would assume without said force when substantially weight supported at said changed temperature, said force being applied by controlling energy valve means between a source of energy and a force applying means in response to said changed temperature to correlate said desired position with said changed temperature.

5. A device for controlling the position of at least a portion of high temperature piping comprising a first member having anchoring means, a second member having pipe attaching means and movable with respect to said first member to change the length of said device between said anchoring means and piping attaching means, means for driving one of said members with respect to the other to change the length of the device, energy valve means operably connected to said driving means, and control means operably connected to said energy valve means and responsive to a temperature change for controlling said energy valve means, said control means including an element movable in response to said temperature change independently of changes in said length to control said energy valve means to actuate said driving means, means responsive to relative movement between said first and second members to deactuate said driving means, said last mentioned means and said movable member correlating said length with temperature.

6. An apparatus according to claim 1, said desired position being different from the position to which said portion would move due to said changed condition without said force when substantially weight supported.

7. Apparatus according to claim 1, in which said force is applied to said portion at a point thereon and in which said condition responsive means to control said energy valve means is responsive to an indicia of change in equipment temperature other than movement of said point in a direction parallel to the direction of force exertion.

8. Apparatus according to claim 1, said portion of said equipment comprising a portion of a piping system and in which said change in thermal condition comprises a change in temperature of said system.

9. Apparatus according to claim 8 in which said fluid handling equipment comprises a fluid handling member mounted on fixed structure and in which said piping system portion comprises a pipe having one end connected to said member and having a point thereon spaced from said pipe end and defining therewith said pipe portion, said pipe point following a first path in space with changes in temperature of the system as a result of any movement of said member connection, any change in length of the pipe and any movement of any other connections thereon due to said changes in temperature, said force applying means comprising a motor-driven force exerting unit adapted to be connected between said pipe at said point and said fixed structure, said force exerting unit being oriented in space to exert force on said point to move said point along a desired path which differs from said first mentioned path, said energy valve means and means for controlling the same being operably connected to said pipe and to said unit and being responsive to said temperature changes to actuate said unit in accordance therewith to move said point along said desired path.

10. An apparatus acccording to claim 8, in which said piping system connects by at least one connection units which resist free thermal movement of said system, said desired position being one in which the strain which would be present on said connection at said changed temperature without said force, is reduced.

11. Apparatus according to claim 8, in which said system connects by at least one connection units which resist free thermal movement of said system, said portion being adjacent the connection between said system and at least one of said units, said desired position approximating the position of said portion at said changed temperature if it were disconnected from the remainder of the piping system.

12. Apparatus according to claim 8, in which said system connects by at least one connection units which resist free thermal movement of said system, said portion being adjacent the connection between said system and at least one of said units, said desired position being that at which the strain on said connection at said changed temperature approximates the strain thereon if said portion were disconnected from the rest of the system.

13. Apparatus according to claim 8, in which said system connects by at least one connection units which resist free thermal movement of said system, said desired position approximating the calculated position of said portion at said changed temperature to thereby prevent said portion from moving to a position at said changed temperature different from that calculated due to any uncalculated expansion and contraction caused by non-uniformities in said system.

14. Apparatus according to claim 8, in which said system connects by at least one connection units which resist free thermal movement of said system, said portion being adjacent the connection between said system and at least one of said units, said desired position being that at which the strain on said connection at said changed temperature approximates the strain thereon at the calculated position of said portion at said temperature to thereby prevent any uncalculated expansion and contraction of said system from causing said strain to be substantially different from that which would exist with said portion in its calculated position.

15. Apparatus according to claim 8, said force applying means comprising at least a pair of force applying mechanisms each of which is attached at one end to said portion at a point of attachment and at its other end to a fixed sructure at a point of attachment, said points of attachment of each of said mechanisms lying on a line, said lines defined by the points of attachment of said mechanisms being non-coincidental, each of said mechanisms being responsive to said change in temperature to adjust the length of said mechanism between said points of attachment, whereby the position of said portion in space at said changed temperature is controlled.

16. An apparatus in accordance with claim 8, in which said force applying means comprises a motor driven jack having a first portion adapted to be secured to fixed structure and having a second portion which is movable with respect to said first portion to adjust the length of the jack and which is adapted to be connected to said system.

17. Apparatus in accordance with claim 8, in which said energy valve means comprises an electric switch actuated by said changes in temperature, in which said force applying means comprises a motor driven jack having an electric motor which is connected to said switch and which is turned on by said actuation of said switch, a member associated with said jack and moved by operation of said motor, said member deactuating said switch to turn off said motor after a predetermined amount of said member movement.

18. Apparatus according to claim 8, said means for applying force being a movable motor-driven jack having a motor, said means for controlling said energy valve means comprising an electrical null balance circuit including a first component which produces an unbalancing current flow in the circuit with changes in said system temperature, said energy valve means comprising a switch connected to said motor and to said circuit, said switch being actuated by said unbalancing current flow to turn on said motor, and said electrical null balance circuit including a second component which is associated with said jack and which reduces said unbalancing current flow with movements of said jack.

19. Apparatus according to claim 8, said force applying means comprising a movable motor driven jack having a motor, said means for controlling said energy valve means comprising a first potentiometer having a resistor which is thermally connected to said system and the resistance of which increases with increases in said system temperature, and further comprising a second potentiometer having a resistor which is connected to said jack and to said first potentiometer resistor and the resistance of which changes in one direction with movement of said jack in one direction, said energy valve means comprising a switch connected to said potentiometers and responsive to an increase in the first potentiometer resistance to turn on said motor to move said jack in said one direction of jack movement and responsive to a said resistance change in said one direction in the second potentiometer resistor to turn off said motor.

20. An apparatus according to claim 8 in which said system is connected with a unit by a connection, said change in position of said portion being due to thermal movement of said system and unit due to changes in temperature, said force being in addition to any weight supporting force and forcing said portion to move to said desired position at said changed temperature irrespective of the change in position said portion would have had due to said thermal movement without said force.

21. An apparatus according to claim 8, in which said system is connected with a unit by a connection, said change in position of said portion being due to thermal movement of said system and unit due to changes in temperature, in which said portion is adjacent said connection and in which said force forces said portion to move to a desired position approximating its calculated position at said changed temperature irrespective of uncalculated expansion and contraction caused by non-uniformities in said piping system.

22. An apparatus according to claim 8 in which said system is connected with a unit by a connection, in which said change in position of said portion is due to thermal movement of said system and unit due to changes in temperature, in which said portion is adjacent said connection and in which said force forces said portion to move to a desired position approximating that which it would occupy if said portion were disconnected from the remainder of said system.

23. Apparatus according to claim 8 in which said system is connected with a unit by a connection, in which said pipe portion is adjacent said connection, in which said change in position of said portion is due to thermal movement of said system and unit, in which each of said system and unit resist said thermal movement of the other to effect stress on said connection without said force applying means and in which said force applying means controls movement of said portion to isolate said connection at least in part from said effect of said thermal movement due to said change in temperature.

24. A method according to claim 4, in which said piping system connects units which resist free thermal expansion and contraction of said system, said portion being adjacent the connection between said system and at least one of said units, said desired position approximating the position of said portion at said changed temperature if it were disconnected from the remainder of said system.

25. A method according to claim 4, in which said piping system connects units which resist free thermal expansion and contraction of said system, said portion being adjacent the connection between said system and at least one of said units, said desired position approximating the calculated position of said portion at said changed temperature irrespective of any uncalculated thermal movement due to non-uniformities in said system which would cause said portion to assume a position different than calculated position without the application of said force.

26. An apparatus according to claim 9, further comprising at least one additional motor driven force exerting unit connected to said pipe and responsive to said temperature changes to contribute to the movement of said point along said desired path.

27. A device according to claim 5, said first and second parts comprising a motor driven jack, said driving means comprising an electric motor for driving said jack, said energy valve comprising an electric switch for controlling said motor.

28. A device according to claim 27, said movable member being movable over a range of positions in response to changes in temperature over a range of temperatures, each position within said range of positions corresponding to a temperature within said range of temperatures, said driving means being responsive to said movement of said movable member to control said energy valve to change said length over a range of lengths, each length within said range of lengths corresponding to a position of said movable member whereby said length is correlated with temperature.

29. A device according to claim 28, said jack comprising a screw jack.

References Cited in the file of this patent

UNITED STATES PATENTS

| | | |
|---|---|---|
| 2,248,730 | Wood | July 8, 1941 |
| 2,572,386 | Ray | Oct. 23, 1951 |
| 2,636,351 | Brooks | Apr. 28, 1953 |
| 2,787,124 | Donahue | Apr. 2, 1957 |
| 2,929,397 | Sloan | Mar. 22, 1960 |

UNITED STATES PATENT OFFICE
CERTIFICATE OF CORRECTION

Patent No. 3,115,886 December 31, 1963

Albert J. Loepsinger

It is hereby certified that error appears in the above numbered patent requiring correction and that the said Letters Patent should read as corrected below.

Column 20, line 50, for "member" read -- element --; column 24, line 2, for "parts" read -- members --; line 4, after "valve" insert -- means --; same line 24, lines 7, 12 and 15, for "member", each occurrence, read -- element --; same column 24, line 13, after "valve" insert -- means --.

Signed and sealed this 30th day of June 1964.

(SEAL)
Attest:

ERNEST W. SWIDER
Attesting Officer

EDWARD J. BRENNER
Commissioner of Patents